United States Patent
Lee et al.

(10) Patent No.: US 11,544,507 B2
(45) Date of Patent: Jan. 3, 2023

(54) METHOD AND APPARATUS TO TRAIN IMAGE RECOGNITION MODEL, AND IMAGE RECOGNITION METHOD AND APPARATUS

(71) Applicant: Samsung Electronics Co., Ltd., Suwon-si (KR)

(72) Inventors: Wonhee Lee, Yongin-si (KR); Minjung Son, Suwon-si (KR); Kyungboo Jung, Seoul (KR); Hyun Sung Chang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 306 days.

(21) Appl. No.: 16/367,358

(22) Filed: Mar. 28, 2019

(65) Prior Publication Data
US 2020/0125899 A1    Apr. 23, 2020

(30) Foreign Application Priority Data

Oct. 17, 2018 (KR) .................. 10-2018-0123487

(51) Int. Cl.
  *G06V 10/82*    (2022.01)
  *G06K 9/62*    (2022.01)
(52) U.S. Cl.
  CPC ......... *G06K 9/6262* (2013.01); *G06K 9/6215* (2013.01)
(58) Field of Classification Search
  None
  See application file for complete search history.

(56) References Cited

U.S. PATENT DOCUMENTS

| | | | |
|---|---|---|---|
| 9,863,775 B2 | 1/2018 | Kojo | |
| 2009/0080780 A1* | 3/2009 | Ikeda | G06T 7/75 382/209 |
| 2010/0232727 A1* | 9/2010 | Engedal | H04N 13/204 382/285 |
| 2014/0343842 A1* | 11/2014 | Ranganathan | G01C 21/30 701/472 |
| 2015/0371397 A1* | 12/2015 | Wang | G06K 9/4652 382/159 |
| 2016/0283864 A1 | 9/2016 | Towal | |

(Continued)

FOREIGN PATENT DOCUMENTS

| | | |
|---|---|---|
| KR | 10-2015-0103979 A | 9/2015 |
| KR | 10-2018-0069501 A | 6/2018 |

OTHER PUBLICATIONS

Jung, Heechul, et al. "ResNet-based vehicle classification and localization in traffic surveillance systems." Proceedings of the IEEE conference on computer vision and pattern recognition workshops. 2017. (Year: 2017).*

(Continued)

*Primary Examiner* — Sean M Conner
(74) *Attorney, Agent, or Firm* — NSIP Law

(57) ABSTRACT

An apparatus and method to train an image recognition model to accurately estimate a location of a reference point for each class of landmark is disclosed. The apparatus and method use the image recognition model, which is trained based on calculating a class loss and a class-dependent localization loss from training data based on an image recognition model and training the image recognition model using a total loss comprising the class loss and the localization loss.

14 Claims, 16 Drawing Sheets

(56) References Cited

U.S. PATENT DOCUMENTS

| | | | |
|---|---|---|---|
| 2017/0147905 A1 | 5/2017 | Huang et al. | |
| 2018/0190046 A1 | 7/2018 | Levinson et al. | |
| 2019/0377949 A1* | 12/2019 | Chen | G06K 9/00664 |
| 2020/0117991 A1* | 4/2020 | Suzuki | G06K 9/628 |

OTHER PUBLICATIONS

Xu, Hongyu, et al. "Deep regionlets for object detection." Proceedings of the European Conference on Computer Vision (ECCV). 2018. (Year: 2018).*

Redmon, Joseph, et al. "You only look once: Unified, real-time object detection." Proceedings of the IEEE conference on computer vision and pattern recognition. 2016. (Year: 2016).*

Ma, Jianqi, et al. "Arbitrary-Oriented Scene Text Detection via Rotation Proposals." (Mar. 2018). (Year: 2018).*

Thi, Tuan Hue, et al., "Structured learning of local features for human action classification and localization", *Image and Vision Computing*, vol. 30, Issue 1, Jan. 2012 (pp. 1-14).

Lin, Di et al., "Deep LAC: Deep Localization, Alignment and Classification for Fine-grained Recognition", *2015 IEEE Conference on Computer Vision and Pattern Recognition (CVPR)*, 2015 (pp. 1666-1674).

Hwang, Sangheum et al., "Self-Transfer Learning for Fully Weakly Supervised Object Localization", arXiv:1602.01625, Feb. 4, 2016 (pp. 1-9).

Liu, Wei, et al., "SSD: Single Shot MultiBox Detector", *Proceedings of the European Conference on Computer Vision*, Dec. 29, 2016 (17 pages in English).

Lin, Tsung-Yi et al., "Focal Loss for Dense Object Detection", *2017 IEEE International Conference on Computer Vision (ICCV)*, Feb. 7, 2018 (pp. 1-10).

Girshick, Ross, "Fast R-CNN", *2015 IEEE International Conference on Computer Vision (ICCV)*, 2015 (pp. 1440-1448).

Shou, Zheng et al., "Temporal Action Localization in Untrimmed Videos via Multi-stage CNNs", *2016 IEEE Conference on Computer Vision and Pattern Recognition (CVPR)*, 2016 (pp. 1049-1058).

He, Wenhao et al., "Deep Direct Regression for Multi-oriented Scene Text Detection", *2017 IEEE International Conference on Computer Vision (ICCV)*, 2017 (pp. 1-9).

Ren, Shaoqing, et al. "Faster R-CNN: Towards Real-Time Object Detection with Region Proposal Networks", *IEEE Transactions on Pattern Analysis and Machine Intelligence*, vol. 39, Issue 6, 2017 (pp. 1-14).

Cao, Yuhang, et al. "Prime sample attention in object detection." *arXiv preprint* arXiv:1904.04821, 2019 (pp. 1-10).

Extended European Search Report dated Dec. 6, 2019 in counterpart European Application No. 19178016.2 ( 8 pages in English).

\* cited by examiner

METHOD AND APPARATUS TO TRAIN IMAGE RECOGNITION MODEL, AND IMAGE RECOGNITION METHOD AND APPARATUS

CROSS-REFERENCE TO RELATED APPLICATIONS

This application claims the benefit under 35 USC § 119(a) of Korean Patent Application No. 10-2018-0123487 filed on Oct. 17, 2018, in the Korean Intellectual Property Office, the entire disclosure of which is incorporated herein by reference for all purposes.

BACKGROUND

1. Field

The following description relates to training an image recognition model.

2. Description of Related Art

Automation of image recognition has been implemented through a processor implemented neural network model, as a specialized computational architecture, which after substantial training may provide computationally intuitive mappings between input patterns and output patterns. The trained capability of generating such mappings may be referred to as a learning capability of the neural network. Further, because of the specialized training, such specially trained neural network may thereby have a generalization capability of generating a relatively accurate output with respect to an input pattern that the neural network may not have been trained to recognize. However, because such operations or applications are performed through specialized computation architecture, and in different automated manners than they would have been performed in non-computer implemented or non-automated approaches, they also invite problems or drawbacks that only occur because of the automated and specialized computational architecture on which they are implement.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of training an image recognition model, including calculating a class loss and a class-dependent localization loss from training data based on an image recognition model, and training the image recognition model using a total loss including the class loss and the localization loss.

The calculating of the class loss and the class-dependent localization loss may include calculating temporary class information and temporary reference point information from an input training image based on the image recognition model, calculating the class loss based on the temporary class information and ground truth class information, and calculating the localization loss based on the temporary reference point information and ground truth reference point information.

The calculating of the temporary class information and the temporary reference point information may include calculating temporary class information and temporary reference point information for each of subregions of the input training image.

The calculating of the class loss may include calculating a partial class loss between the ground truth class information and the temporary class information calculated for the each of the subregions of the input training image, and determining a sum of partial class losses calculated for the each of the subregions of the input training image to be the class loss.

The calculating of the class loss may include selecting subregions corresponding to a ground truth landmark portion from among the subregions of the input training image, calculating a partial class loss between the ground truth class information and temporary class information calculated for each of the selected subregions, and determining a sum of partial class losses calculated for the selected subregions to be the class loss.

The selecting of the subregions may include further selecting a subregion corresponding a ground truth background portion from among the subregions of the input training image.

The calculating of the localization loss may include calculating, for each of the subregions of the input training image, a partial localization loss between the ground truth reference point information and temporary reference point information calculated for the each of the subregions of the input training image, and determining a sum of partial localization losses calculated for the each of the subregions to be the localization loss.

The calculating of the localization loss may include selecting subregions corresponding to a ground truth landmark portion from among the subregions of the input training image, calculating a partial localization loss between the ground truth reference point information and temporary reference point information of each of the selected subregions, and determining a sum of partial localization losses calculated for the selected subregions to be the localization loss.

The calculating of the partial localization loss may include excluding a subregion with a ground truth background portion from the selected subregions.

The calculating of the temporary class information and the temporary reference point information for the each of the subregions of the input training image may include calculating temporary class information and temporary reference point information for each of anchor nodes set for the each of the subregions.

The calculating of the temporary class information and the temporary reference point information for the each of the anchor nodes may include calculating temporary class information and temporary reference point information for an anchor node having a highest confidence level from among confidence levels calculated for each of the anchor nodes.

The calculating of the temporary class information and the temporary reference point information for each of the anchor nodes may include excluding an anchor node having a confidence level less than a threshold from among confidence levels calculated for each of the anchor nodes.

The calculating of the class loss and the class-dependent localization loss may include calculating a class-based weight based on temporary class information, and determining the class-dependent localization loss based on the class-based weight, temporary reference point information, and ground truth reference point information.

The determining of the class-dependent localization loss may include determining the class-dependent localization loss by applying the class-based weight to a difference between the temporary reference point information and the ground truth reference point information.

The training may include updating a parameter of the image recognition model to minimize the total loss.

The updating of the parameter may include repeating the updating of the parameter of the image recognition model to converge the total loss.

The updating of the parameter may include updating the parameter such that the class loss is minimized before the localization loss is minimized.

In another general aspect, there is provided a training apparatus including a memory configured to store an image recognition model, and a processor configured to calculate a class loss and a class-dependent localization loss from training data based on the image recognition model, and train the image recognition model using a total loss including the class loss and the localization loss.

In another general aspect, there is provided an image recognition method including obtaining an input image, and estimating, from the input image, a class of a landmark in the input image and a reference point of the landmark, based on an image recognition model.

Other features and aspects will be apparent from the following detailed description, the drawings, and the claims.

Figure 1:
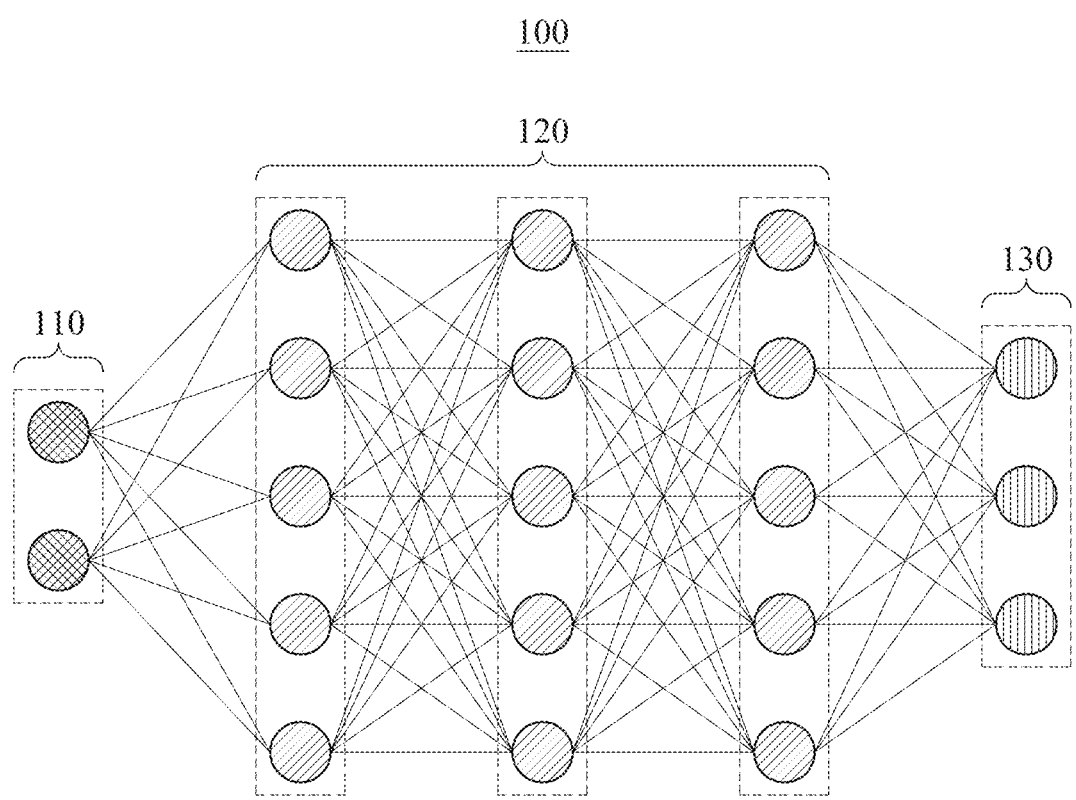
FIG. 1 is a diagram illustrating an example of an image recognition model.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way.

As used herein, the term "and/or" includes any one and any combination of any two or more of the associated listed items.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The use of the term 'may' herein with respect to an example or embodiment, e.g., as to what an example or embodiment may include or implement, means that at least one example or embodiment exists where such a feature is included or implemented while all examples and embodiments are not limited thereto.

Also, in the description of example embodiments, detailed description of structures or functions that are thereby known after an understanding of the disclosure of the present application will be omitted when it is deemed that such description will cause ambiguous interpretation of the example embodiments.

FIG. 1 is a diagram illustrating an example of an image recognition model.

In an example, an image recognition model may be of a machine learning architecture trained to output a result of recognizing an input image. For example, the image recognition model may be embodied by a neural network 100, as illustrated in FIG. 1. However, examples of the image recognition model are not limited to the illustrated example. In an example, the image recognition model may be trained by an apparatus for training the image recognition model, hereinafter simply referred to as a training apparatus. The training apparatus may train the image recognition model with a location and a type, or a class as described herein, of an object, such as, a sign in an image that is output from a camera installed in a vehicle. An image recognition apparatus may recognize the input image based on the trained image recognition model. For example, the image recognition apparatus may identify an object in the input image based on the trained image recognition model. However, in other examples, the training apparatus and the image recognition apparatus may be integrated together to be embodied as an integral apparatus. Hereinafter, the neural network 100 will be described as an example of the image recognition model with reference to FIG. 1.

In an example, the neural network 100 may be configured as a single network and may also be configured as a recurrent network. In an example, the neural network 100 may be a deep neural network (DNN). The DNN may include a fully-connected network (FCN), a deep convolutional network (DCN), a recurrent neural network (RNN), a long-short term memory (LSTM) network, and a grated recurrent units (GRUs).

In an example, the neural network 100 may be implemented as an architecture having a plurality of layers including an input image, feature maps, and an output. In the neural network, a convolution operation between the input image, and a filter referred to as a kernel, is performed, and as a result of the convolution operation, the feature maps are output. Here, the feature maps that are output are input feature maps, and a convolution operation between the output feature maps and the kernel is performed again, and as a result, new feature maps are output. Based on such repeatedly performed convolution operations, results of recognition of characteristics of the input image via the neural network may be output.

The neural network 100 may map input data and output data that have a nonlinear relationship based on deep learning to perform tasks such as, for example, object classification, object recognition, audio or speech recognition, and image recognition. The deep learning may be a type of machine learning that is applied to perform image recognition or speech recognition from a big dataset. The deep learning may be performed in supervised and/or unsupervised manners, which may be applied to perform the mapping of input data and output data.

In another example, the neural network may include an input source sentence (e.g., voice entry) instead of an input image. In such an example, a convolution operation is performed on the input source sentence with a kernel, and as a result, the feature maps are output. The convolution operation is performed again on the output feature maps as input feature maps, with a kernel, and new feature maps are output. When the convolution operation is repeatedly performed as such, a recognition result with respect to features of the input source sentence may be finally output through the neural network.

Referring to FIG. 1, the neural network 100 includes an input layer 110, a hidden layer 120, and an output layer 130. Each of the input layer 110, the hidden layer 120, and the output layer 130 may include a plurality of artificial nodes.

Although the hidden layer 120 is illustrated as including three layers in FIG. 1 for convenience of description, the hidden layer 120 may include other numbers of layers. In addition, although the neural network 100 is illustrated as including a separate input layer, for example, the input layer 110, to receive input data, the input data may be directly input to the hidden layer 120. The artificial nodes described above will be simply referred to as nodes, and nodes of layers of the neural network 100 excluding ones of the output layer 130 may be connected to nodes of a next layer through links to transmit an output signal. The number of the links may correspond to the number of the nodes included in the next layer. In an example, the neural network 100 may include additional layers, such as, for example, a sub-sampling layer, a pooling layer, and a fully connected layer.

An output of an activation function associated with weighted inputs of nodes included in a previous layer may be input to each of the nodes included in the hidden layer 120. The weighted inputs may be obtained by multiplying an input of the nodes included in the previous layer by a connection weight. The connection weight may also be referred to as a parameter of the neural network 100. In an example, the activation function may include a sigmoid function, a hyperbolic tangent (tan h) function, and a rectified linear unit (ReLU), and nonlinearity may be formed in the neural network 100 by the activation function. The weighted inputs of the nodes included in the previous layer may be input to each of the nodes included in the output layer 130.

When input data is given, the neural network 100 may calculate a function value based on the number of classes to be classified and recognized in the output layer 130 through the hidden layer 120, and classify and recognize the input data as a class having a greatest function value. Although the neural network 100 may classify or recognize the input data, the classification and recognition by the neural network 100 will be described simply as recognition for convenience of description. Thus, the following description of the recognition may also be applied to the classification unless otherwise defined.

When a width and a depth of the neural network 100 are sufficiently large, the neural network 100 may have a capacity such that the neural network 100 implements a function. When the neural network 100 learns a sufficiently large amount of training data through training, the neural network 100 may obtain an optimal performance of recognition.

Figure 2:
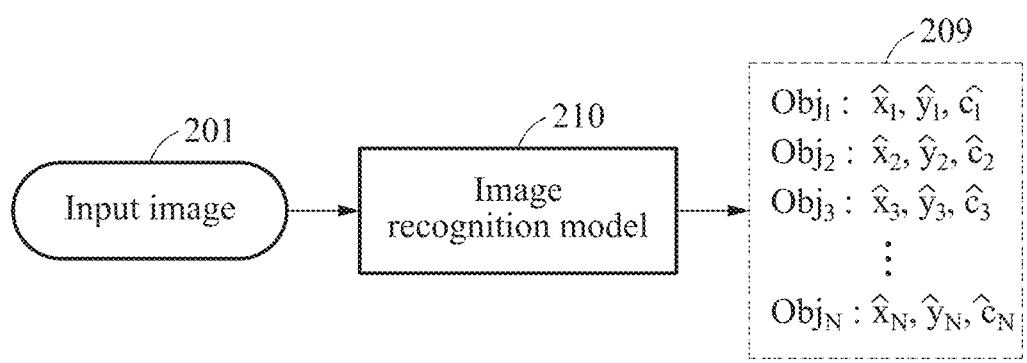
FIG. 2 is a diagram illustrating an example of recognizing an input image based on an image recognition model.

FIG. 2 is a diagram illustrating an example of recognizing an input image based on an image recognition model.

Referring to FIG. 2, an image recognition apparatus calculates output data 209 from an input image 201 based on an image recognition model 210. For example, the image recognition apparatus may estimate a class of a landmark and a reference point of the landmark from the input image 201 based on the image recognition model 210. A landmark will be described hereinafter with reference to FIG. 3, and a class and a reference point of the landmark will be described hereinafter with reference to FIGS. 4A through 4F.

The output data 209 includes information associated with each of classes and reference points of landmarks. For example, the image recognition apparatus may identify a maximum of N landmarks and calculate, as the output data 209, coordinates of a reference point of an $i^{th}$ landmark and class information of the $i^{th}$ landmark. As illustrated in FIG.

2, the $i^{th}$ landmark is indicated as $Obj_i$, the coordinates of the reference point of the $i^{th}$ landmark, for example, $(\hat{x}_i, \hat{y}_i)$, and the class information of the ith landmark, for example, $\hat{c}_i$, in which N denotes an integer greater than or equal to 1, and i denotes an integer greater than or equal to 1 and less than or equal to N. The class information $\hat{c}_i$ indicates a class indicating a type, or a class as described herein, to which the $i^{th}$ landmark belongs among various classes of landmark.

A landmark in an input image including various objects will be described hereinafter with reference to FIG. 3.

Figure 3:
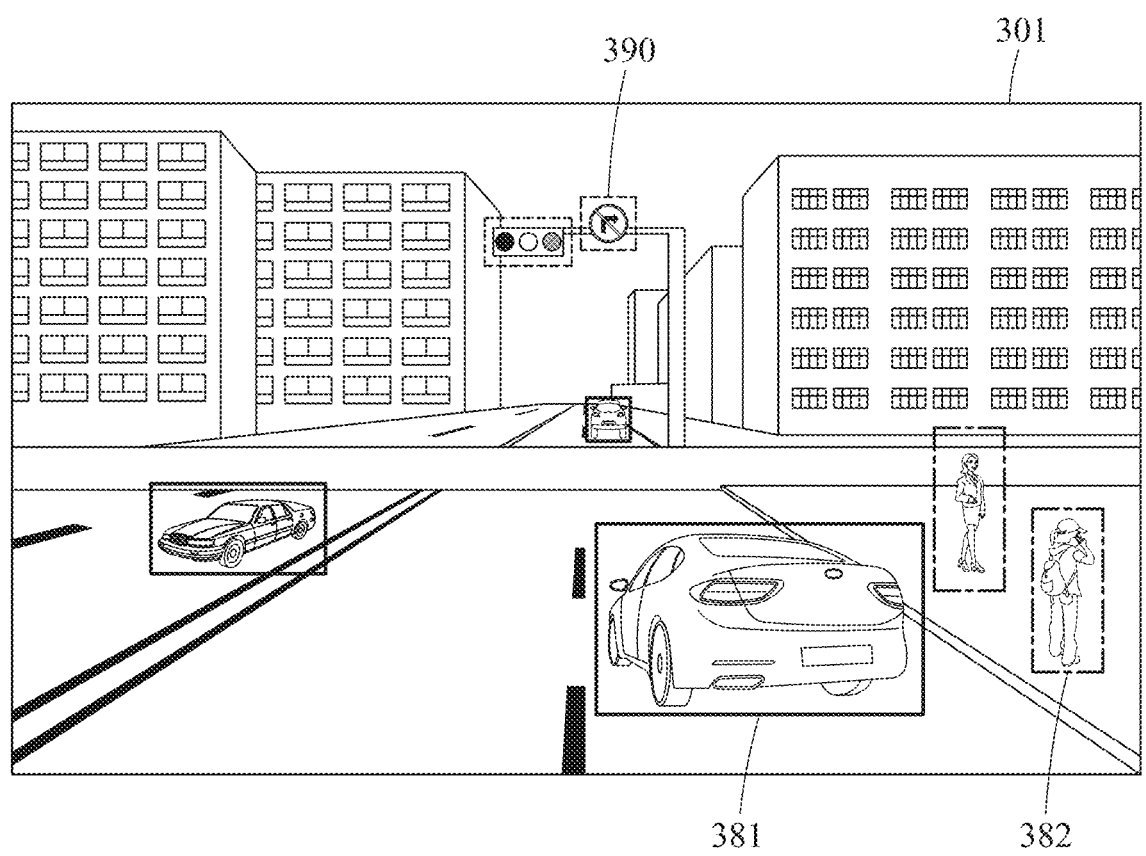
FIG. 3 is a diagram illustrating examples of objects in an image.

FIG. 3 is a diagram illustrating examples of objects in an image.

Referring to FIG. 3, an input image 301 includes various objects. As illustrated, the objects include a traveling object 381 that travels on a road, and a vehicle may be the traveling object 381. The objects also include a traveling object 382 that moves on a sidewalk, and a human being and an animal may be the traveling object 382. A landmark object 390, which is simply referred to as a landmark herein, may represent an object fixed at a geographical location to provide a driver with information needed to drive the road. For example, the landmark 390 may include a road sign, a traffic light, and the like.

In an example, the landmark 390 may be installed at a main point of traffic or may be disposed at a set location, and provide useful information for autonomous driving. Thus, an image recognition apparatus may classify a class of the landmark 390 and estimate a location of a reference point of the landmark 390 based on an image recognition model. A training apparatus may train the image recognition model such that the image recognition model may classify the class of the landmark 390 in the input image 301, and estimate the location of the reference point of the landmark 390.

FIGS. 4A through 4F are diagrams illustrating examples of various landmarks.

FIGS. 4A through 4F illustrate various classes of landmark. In an example, according to a Korean road traffic act, landmarks may be classified into a total of six classes. For example, landmarks may be classified into a warning sign 411, a regulating sign 412, an indicating sign 413, an auxiliary sign 414, a signal 415, and a road marking 416 as illustrated in FIGS. 4A through 4F.

Figure 4A:
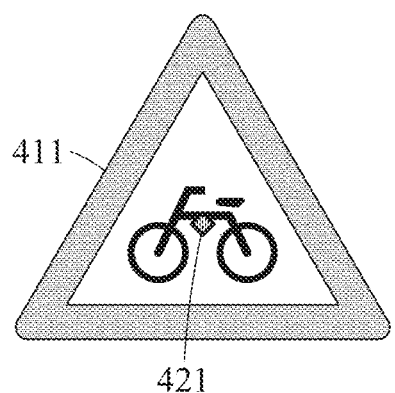
FIGS. 4A through 4F are diagrams illustrating examples of various landmarks.

FIG. 4A illustrates an example of the warning sign 411. The warning sign 411 indicates a signal that informs a user of a road of a potentially dangerous road condition or a dangerous object nearby such that the user may take safety measures, if needed. In an example, a reference point 421 of a landmark belonging to a class of the warning sign 411 may be a center point of a bounding box surrounding the landmark, for example, a two-dimensional (2D) bounding box on an image.

Figure 4B:
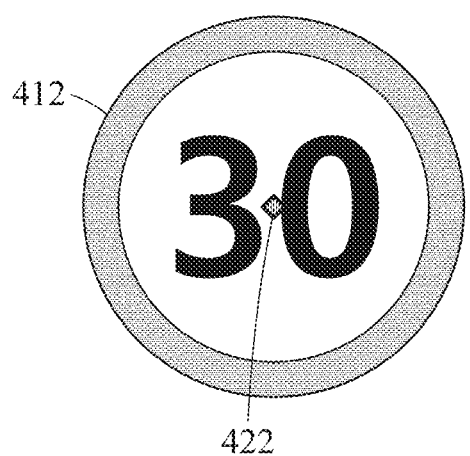

FIG. 4B illustrates an example of the regulating sign 412. The regulating sign 412 informs a user of a road of various regulations such as limits, restrictions, prohibitions for road traffic safety. A reference point 422 of a landmark belonging to a class of the regulating sign 412 may be a center point of a bounding box surrounding the landmark.

Figure 4C:
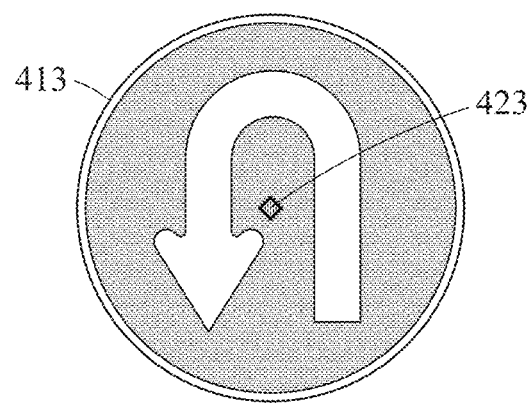

FIG. 4C illustrates an example of the indicating sign 413. The indicating sign 413 indicates a sign that informs a user of a road of indications or instructions for road traffic safety, such as, for example, a method for passage or a passage classification. A reference point 423 of a landmark belonging to a class of the indicating sign 413 may be a center point of a bounding box surrounding the landmark.

Figure 4D:
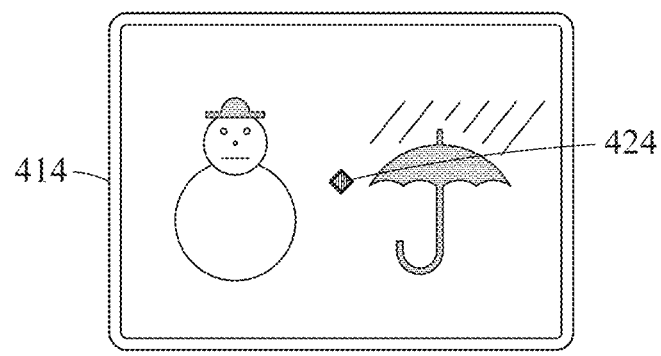

FIG. 4D illustrates an example of the auxiliary sign 414. The auxiliary sign 414 indicates an additional sign that is provided in addition to main functions of the warning sign 411, the regulating sign 412, and the indicating sign 413. A reference point 424 of a landmark belonging to a class of the auxiliary sign 414 may be a center point of a bounding box surrounding the landmark.

Figure 4E:
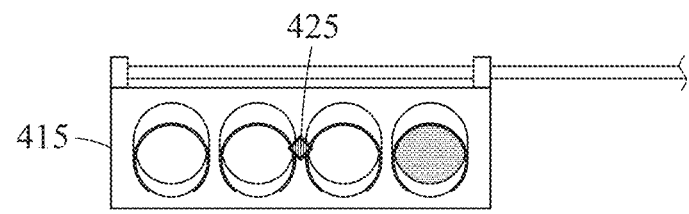

FIG. 4E illustrates an example of the signal 415. The signal 415 indicates an installation performing a function of assigning priority to various objects in traffic by displaying, lighting, or blinking a character, a sign, and the like to inform a user of a road of progresses, stops, switches, cautions, and the like in road traffic. A reference point 425 of a landmark belonging to a class of the signal 415 may be a center point of a bounding box surrounding the signal 415.

Figure 4F:
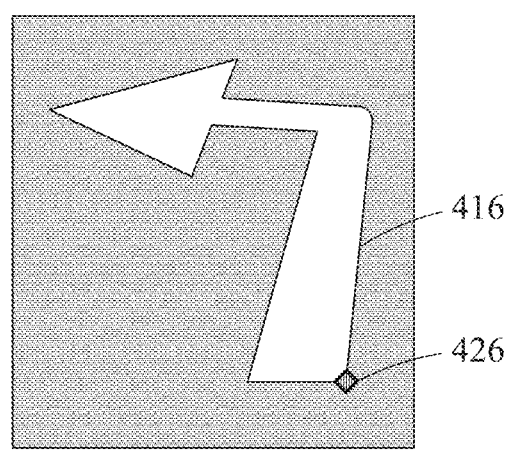

FIG. 4F illustrates an example of the road marking 416. The road marking 416 indicates a mark on a road that informs a user of the road of details including, for example, various cautions, regulations, and indications, through a character, a sign, a line, and the like for road traffic safety. A reference point 426 of a landmark belonging to a class of the road marking 416 may be a lower right end point of the landmark, i.e., a point at a lower right end of the landmark.

Various examples of landmark have been described above. However, a class of a landmark and a set location of a reference point of the landmark are not limited to the illustrated examples. A class of a landmark may vary depending on a country, and a location of a reference point may vary depending on a class.

An image recognition model described herein may be configured to more accurately estimate a location of a reference point that may vary for each class as described above. Other types of classification of the landmarks, such as, for example, Manual on Uniform Traffic Control Devices (MUTCD), Standard Highway Signs (SHS), and Vienna Convention on Road Signs and Signals standards, may be used without departing from the spirit and scope of the illustrative examples described.

Figure 5:
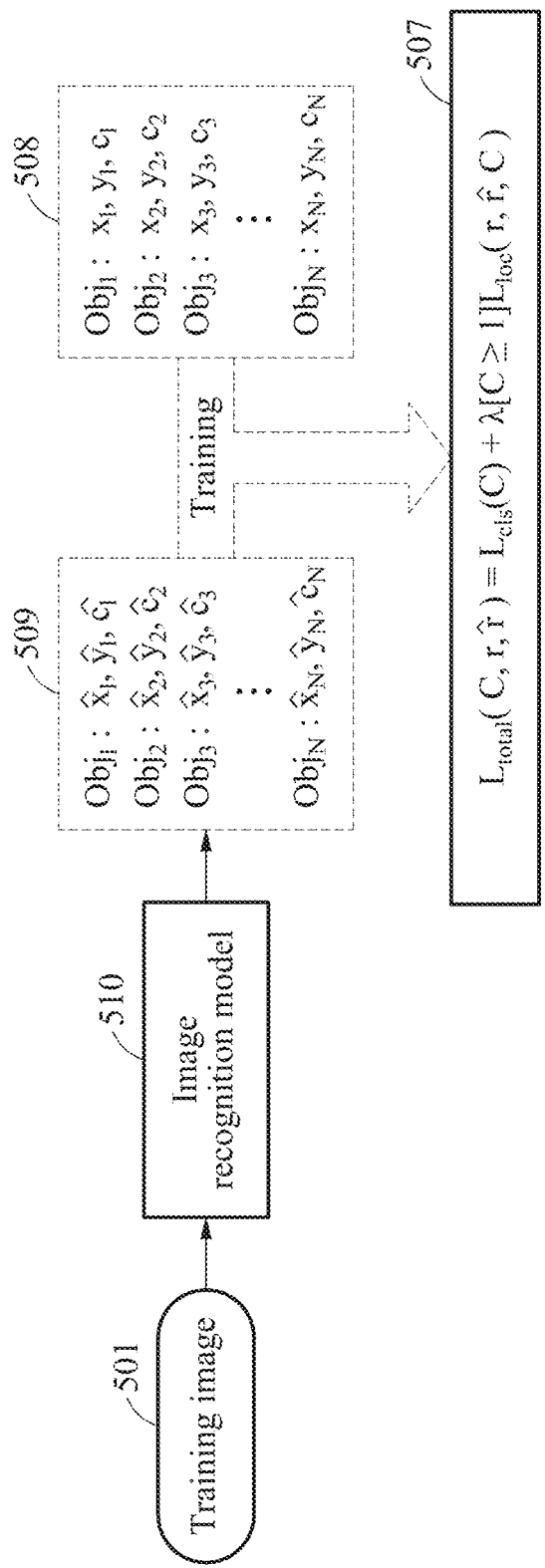
FIG. 5 is a diagram illustrating an example of training an image recognition model.

FIG. 5 is a diagram illustrating an example of training an image recognition model.

A training apparatus may train an image recognition model 510 based on training data. The training data may include a pair of a training input and a training output corresponding to the training input. The training input may be a training image 501 as illustrated in FIG. 5. The training output may be ground truth (GT) data 508 that is provided for the training input as illustrated in FIG. 5. In an example, the GT data 508 includes a GT class of a landmark in the training image 501 and GT reference point coordinates.

Referring to FIG. 5, the training apparatus calculates a temporary output 509 from the training image 501 based on the image recognition model 510. In an example, the image recognition model 510 for which training is not completed may be referred to as a temporary model. In addition, an output of the temporary model may also be referred to as the temporary output 509. As illustrated, the training apparatus calculates, as the temporary output 509, reference point information $(\hat{x}_i, \hat{y}_i)$ of the landmark in the training image 501 and class information $\hat{c}_i$ of the landmark in the training image 501.

The training apparatus calculates a loss based on the calculated temporary output 509 and the GT data 508. For example, the training apparatus may calculate a class loss based on temporary class information and GT class information, and calculate a localization loss based on temporary reference point coordinates and GT reference point coordinates. In an example, a total loss 507 of the temporary model with respect to the landmark in the training image 501 is represented by Equation 1.

$$L_{total}(C,r,\hat{r}) = L_{cls}(C) + \lambda[C \geq 1] L_{loc}(r,\hat{r},C) \quad \text{[Equation 1]}$$

In Equation 1, $L_{total}$ denotes the total loss 507, and $L_{cls}$ and $L_{loc}$ denote the class loss and the localization loss, respectively. C denotes the GT class provided to the landmark in the training image 501. r denotes the GT reference point coordinates (x, y) provided to the landmark in the training image 501, and $\hat{r}$ denotes the temporary reference point coordinates ($\hat{x}$, $\hat{y}$) calculated by the temporary model. $L_{cls}(C)$ denotes the class loss between the GT class information and the temporary class information of the landmark in the training image 501 estimated based on the temporary model. $L_{loc}(r, \hat{r}, C)$ denotes the localization loss between the GT reference point information and the temporary reference point information of the landmark in the training image 501 that is estimated based on the temporary model. $\lambda[C \geq 1]$ denotes a weight to be set by a user with respect to the localization loss. For example, the localization loss may be excluded from the total loss 507 when a class corresponding to a background, not a landmark, is included in the training image 501, for example, when C=0, but the localization loss may be included in the total loss 507 only when a landmark is included in the training image 501.

In an example, the training apparatus may train the image recognition model 510 such that the total loss 507 calculated as described above is reduced, or alternatively, minimized. For example, the training apparatus may repetitively update a parameter of the image recognition model 510 until the total loss 507 converges.

The localization loss is partially dependent on a class as represented by Equation 1 above, and thus, the training apparatus may train the image recognition model 510 such that accuracy in estimating a location, or in localization, increases as accuracy in estimating a class increases.

The calculation of a total loss based on Equation 1, and a training process will be described in greater detail with reference to FIG. 6.

Figure 6:
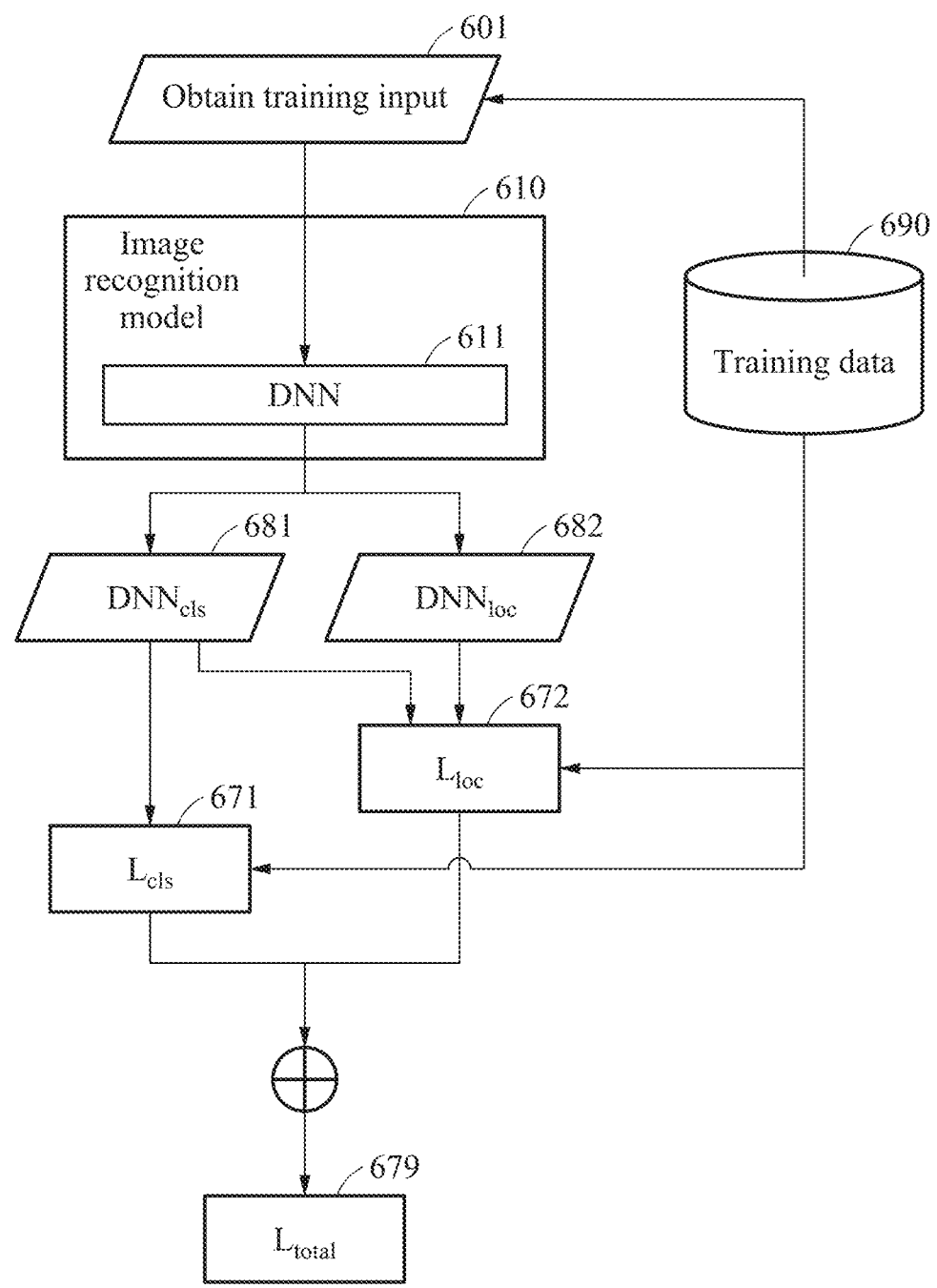
FIG. 6 is a diagram illustrating an example of training an image recognition model.

FIG. 6 is a diagram illustrating an example of how an image recognition model is trained. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. One or more blocks of FIG. 6, and combinations of the blocks, can be implemented by special purpose hardware-based computer, such as a processor, that perform the specified functions, or combinations of special purpose hardware and computer instructions. In addition to the description of FIG. 6 below, the descriptions of FIG. 1-5 are also applicable to FIG. 6, and are incorporated herein by reference. Thus, the above description may not be repeated here.

Referring to FIG. 6, in operation 601, a training apparatus obtains a training input 601 from training data 690.

The training apparatus calculates a temporary output from the training input 601 based on an image recognition model 610. In an example, the image recognition model 610 includes a DNN 611. The training apparatus calculates, as the temporary output, temporary class information $DNN_{cls}$ 681 and temporary reference point information $DNN_{loc}$ 682.

The training apparatus calculates a class loss $L_{cls}$ 671 for the temporary class information $DNN_{cls}$ 681 as represented by Equation 2.

$$L_{cls}(C) = -\log P^C \quad \text{[Equation 2]}$$

In Equation 2, $L_{cls}$ denotes a class loss with respect to a landmark included in a training image. However, Equation 2 is provided as an example loss function, and thus the class loss is not limited thereto. $P^C$ denotes a class-based weight, which may be represented by Equation 3, for example.

$$P^C = \frac{\exp(p^C)}{\sum_c \exp(p^c)} \quad \text{[Equation 3]}$$

For example, when landmarks are classified into a total of M classes, the temporary class information $DNN_{cls}$ 681 may include a probability that a landmark in a training image belongs to a zeroth class through an M−1th class. For example, the temporary class information $DNN_{cls}$ 681 may be indicated as a class probability vector, for example, $[p^{c_0}, \ldots, p^{c_{M-1}}]$, in which $c_j$ denotes a $j^{th}$ class from among the classes and C denotes a GT class provided to a corresponding landmark. $\Sigma_c \exp(p^C)$ denotes an exponential sum of probabilities of a landmark belonging to each of the classes. In the temporary class information $DNN_{cls}$ 681, $p^C$ denotes a probability of a landmark belonging to a GT class C. Thus, a class-based weight $P^C$ may indicate a quantified value of the probability estimated for the GT class C for the landmark among probabilities estimated for the classes based on the image recognition model 610. The training apparatus may obtain the GT class C from the training data 690.

In addition, the training apparatus calculates a localization loss $L_{loc}$ 672 for the temporary localization information $DNN_{loc}$ 682 as represented by Equation 4.

$$L_{loc}(r, \hat{r}, C) = P^C \sum_{m \in (x,y)} \text{smooth}_{L_1}(m - \hat{m}) \quad \text{[Equation 4]}$$

In Equation 4, $L_{loc}$ denotes a localization loss for a landmark in a training image. m denotes GT reference point coordinates of the landmark, and $\hat{m}$ denotes reference point coordinates estimated based on the image recognition model 610. The training apparatus obtains the GT reference point coordinates from the training data 690. In an example, $\text{smooth}_{L_1}$ denotes a function in which an L1 loss function and an L2 loss function are mixed, and indicates a type of Euclidean distance functions. However, a distance function is not limited to the example function described in the foregoing.

As represented by Equation 4 above, the training apparatus determines a class-dependent localization loss by applying the class-based weight $P^C$ to a difference, for example, a value of $\text{smooth}_{L_1}$, between the temporary reference point information $DNN_{loc}$ 682 and the GT reference point information. Thus, in an example, the localization loss $L_{loc}$ 672 is a loss dependent on the class-based weight $P^C$. Based on the localization loss $L_{loc}$ 672 as represented by Equation 4, the training apparatus may reduce a magnitude of the localization loss $L_{loc}$ 672 in a total loss $L_{total}$ 679 when accuracy of the image recognition model 610 in classification is less than a threshold accuracy, and thereby train first a portion of the image recognition model 610 corresponding to the classification. The training apparatus may increase the magnitude of the localization loss $L_{loc}$ 672 in the total loss $L_{total}$ 679 when the accuracy in the classification is greater than or equal to the threshold accuracy, and thus train a portion of the image recognition model 610 corresponding to localization. Thus, the training apparatus may first increase a performance of the image recognition model 610 in classification and then increase a performance in localization, and train the image recognition model 610 to perform class-based recognizing localization.

For example, when a training image is divided into a plurality of subregions, the training apparatus may calculate a partial class loss for each of the subregions based on Equation 2 above, and calculate a total class loss for the training image based on a sum of partial class losses. In addition, the training apparatus may calculate a partial localization loss, and calculate a total localization loss for the training image based on a sum of partial localization losses. The calculation of a loss for each subregion will be described hereinafter with reference to FIG. 7.

Figure 7:
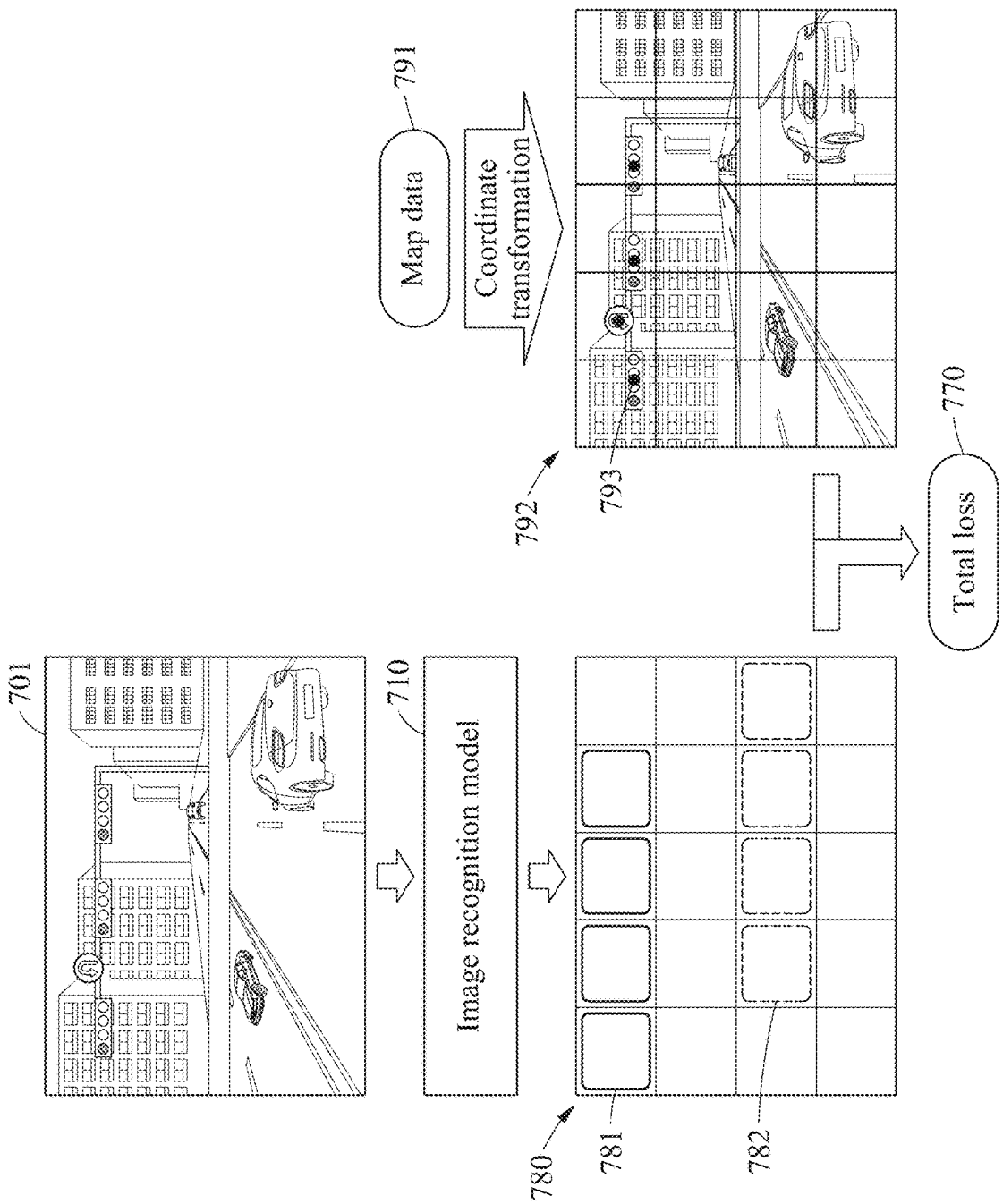
FIG. 7 is a diagram illustrating an example of calculating a loss for each subregion during training.

FIG. 7 is a diagram illustrating an example of calculating a loss for each subregion during training.

Referring to FIG. 7, a training apparatus calculates a temporary output 780 for each subregion from a training image 701 based on an image recognition model 710. For example, the training apparatus may calculate temporary class information and temporary reference point information for each subregion of an input training image. In an example, the training apparatus may calculate, for each subregion of the input training image, a partial class loss between GT class information and the temporary class information calculated for each of the subregion. The training apparatus may determine, to be a class loss, a sum of partial class losses calculated for the subregions, for example, 20 subregions as illustrated in FIG. 7. However, the determining of a class loss is not limited to the illustrated example.

For example, as illustrated in FIG. 7, the training apparatus selects subregions corresponding to a GT landmark portion 781, for example, four subregions, from among the subregions of the input training image. The training apparatus calculates a partial class loss between GT class information and temporary class information calculated for each of the selected subregions. The training apparatus determines, to be the class loss, a sum of the partial class losses calculated for the selected subregions. In addition, the training apparatus further selects subregions corresponding to a GT background portion 782, for example, four subregions, from among the subregions of the input training image. For a balance in training of classification of classes, the training apparatus may determine the number of the subregions corresponding to the GT landmark portion 781 and the number of the subregions corresponding to the GT background portion 782 to be similar.

In addition, the training apparatus calculates a partial localization loss between the GT reference point information and the temporary reference point information calculated for each of the subregions of the input training image. The training apparatus determines, to be a localization loss, a sum of partial localization losses calculated for the subregions. The training apparatus selects subregions corresponding to the GT landmark portion 781 from among the subregions of the input training image. The training apparatus calculates a partial localization loss between the calculated reference point information and the GT reference point information for each of the selected subregions. The training apparatus determines, to be a localization loss, a sum of the partial localization losses calculated for the selected subregions. The training apparatus performs the calculation without a calculation of a partial localization loss for the GT background portion 782, and this is because the GT background portion 782 does not include a landmark, and thus there is no need to calculate a localization loss.

In an example, the training apparatus transforms map data 791 to generate a GT output 792. In an example, the GT output 792 may include GT class information and GT reference point information. In an example, the training apparatus transforms the map data 791 to generate GT reference point information of the GT landmark portion 781. For example, the map data 791 may include information associated with three-dimensional (3D) coordinates at which a landmark is located. In an example, the training apparatus transforms 3D coordinates of a landmark in the training image 701 into 2D coordinates based on a location and a posture, for example, a posture of a vehicle, in the map data 791 at which the training image 701 is captured, and a viewing angle of an image sensor capturing the training image 701. The training apparatus calculates a partial localization loss based on a difference between temporary reference point coordinates calculated for a subregion and GT reference point coordinates 793 transformed from the map data 791.

The training apparatus calculates a total loss 770 based on the class loss, which is a sum of the partial class losses for the subregions, and the localization loss, which is a sum of the partial localization losses for the subregions.

Hereinafter, an anchor node used to calculate a partial class loss and a partial localization loss for each subregion will be described with reference to FIG. 8.

Figure 8:
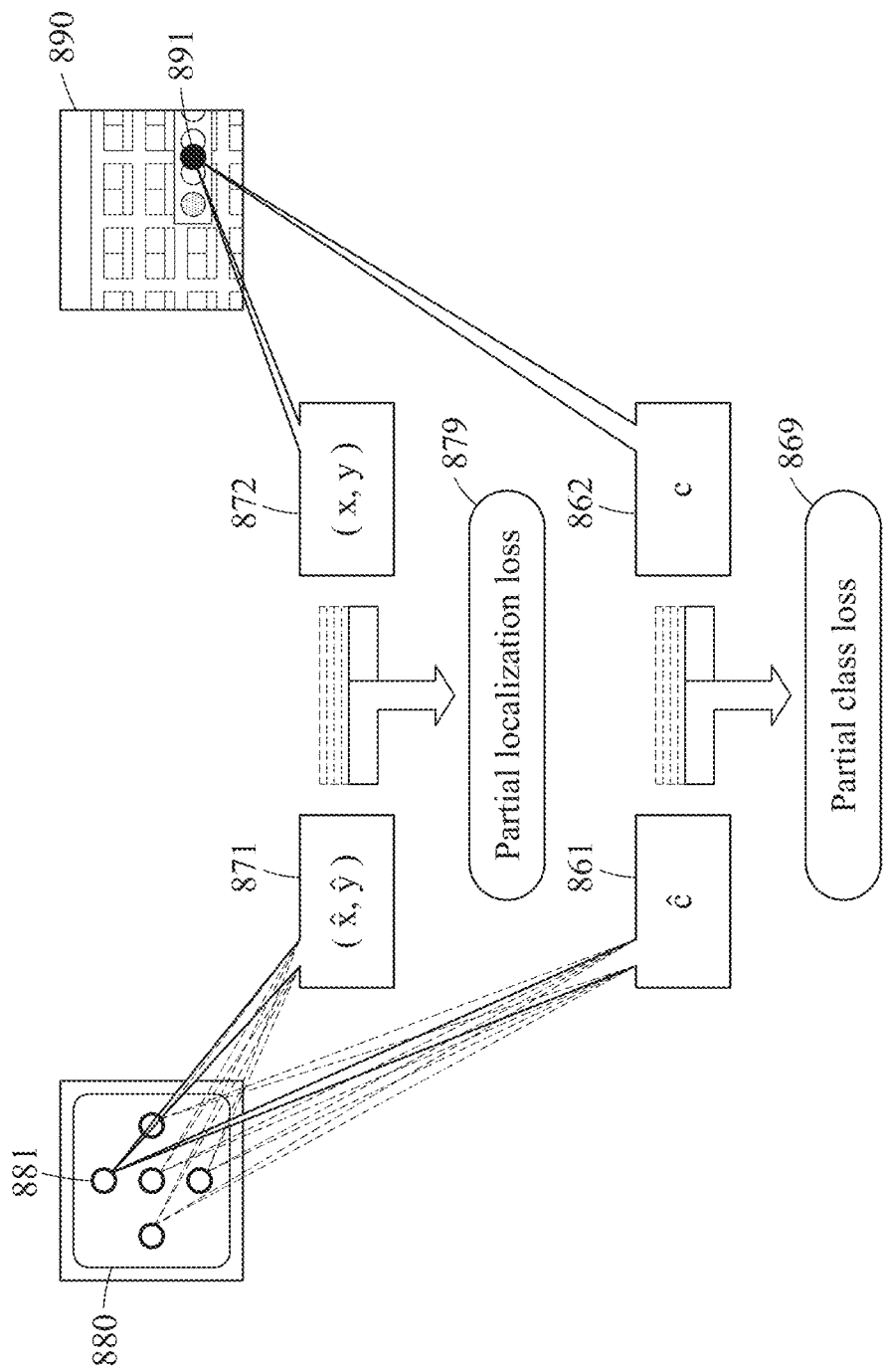
FIG. 8 is a diagram illustrating an example of calculating a loss for each anchor node in each subregion during training.

FIG. 8 is a diagram illustrating an example calculating a loss for each anchor node in each subregion during training.

Referring to FIG. 8, a training apparatus calculates temporary class information and temporary reference point information for each of anchor nodes 881 that is set for each subregion. For example, the training apparatus may set five anchor nodes 881 for each subregion as illustrated.

For example, the training apparatus calculates temporary localization coordinates 871 ($\hat{x}$, $\hat{y}$) for each of the anchor nodes 881 in a subregion 880 of a training image. The training apparatus calculates a difference between the temporary localization coordinates 871 ($\hat{x}$, $\hat{y}$) and GT coordinates (x, y) 872 of a GT reference point 891 included in a subregion 890 corresponding to a reference output. The training apparatus calculates a partial localization loss 879 from a sum of differences between the GT coordinates (x, y) 872 and the temporary localization coordinates ($\hat{x}$, $\hat{y}$) 871 calculated for the anchor nodes 881. In this example, the calculating of the temporary localization coordinates ($\hat{x}$, $\hat{y}$) 871 is described above for convenience of description. However, examples are not limited to the example described in the foregoing. For example, the training apparatus may calculate, as temporary reference point information, an offset from each of the anchor nodes 881 to a reference point, for each of the anchor nodes 881. In this example, the offset may indicate an amount of positional change from a pixel location of each of the anchor nodes 881 to the reference point.

In addition, the training apparatus calculates temporary class information $\hat{c}$ 861 for each of the anchor nodes 881 in the subregion 880 of the training image. The training apparatus calculates a partial class loss 869 from GT class information c 862 included in the subregion 890 corresponding to the reference output and the temporary class information $\hat{c}$ 861.

The training apparatus calculates the partial localization loss 879 and the partial class loss 869 for a subregion by adding losses calculated for the anchor nodes 881. Thus, the training apparatus calculates a total loss by adding partial losses for a plurality of subregions.

Although the calculation of a loss using all the anchor nodes 881 is described above, examples are not limited to the example described in the foregoing. For example, the training apparatus may calculate temporary class information and temporary reference point information for an anchor node having a top confidence level among the anchor nodes 881, based on a confidence level calculated for each of the anchor nodes 881. In an example, the training apparatus may select K anchor nodes having top confidence levels in sequential order from among the anchor nodes 881, and calculate temporary class information and temporary reference point information for each of the selected K anchor nodes. Based on the K anchor nodes selected from a subregion, the training apparatus may calculate a partial loss for the subregion. In this example, K denotes an integer greater than or equal to 1. In an example, the training apparatus may perform the calculation, without a calculation for an anchor node having a confidence level less than a threshold confidence level, based on a confidence level calculated for each of the anchor nodes 881. That is, the training apparatus may not calculate a loss for the anchor node having the confidence level less than the threshold confidence level among the selected K anchor nodes in the subregion. Thus, the training apparatus may calculate a loss only using an anchor node that satisfies the threshold confidence level among the K anchor nodes having the top confidence levels.

Figure 9:
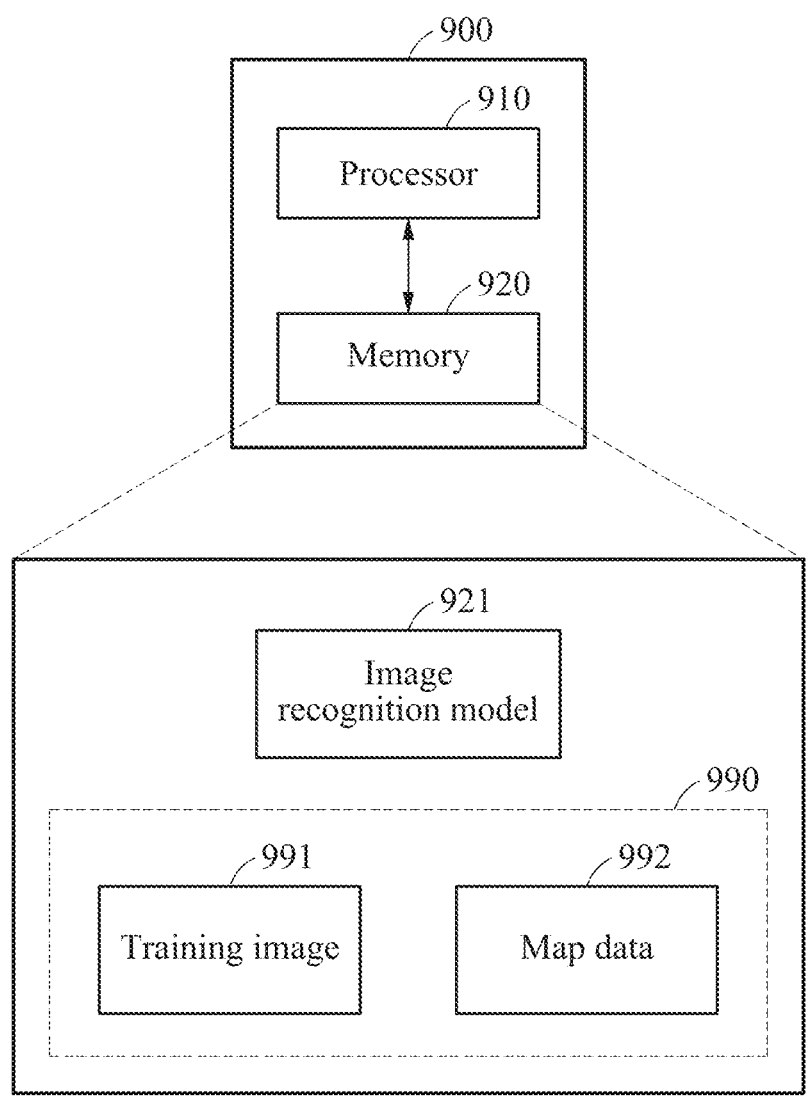
FIG. 9 is a diagram illustrating an example of a training apparatus.

FIG. 9 is a diagram illustrating an example of a training apparatus.

Referring to FIG. 9, a training apparatus 900 includes a processor 910 and a memory 920.

The processor 910 may calculate a class loss and a class-dependent localization loss from training data based on an image recognition model 921. The processor 910 may train the image recognition model 921 using a total loss calculated based on the class loss and the localization loss. However, operations of the processor 910 are not limited to what is described in the forgoing, and the processor 910 may perform at least one method described above with reference to FIGS. 1 to 8 or an algorithm corresponding thereto.

The processor 910 refers to a data processing device configured as hardware with a circuitry in a physical structure to execute desired operations. For example, the desired operations may include codes or instructions included in a program. For example, the data processing device configured as hardware may include a microprocessor, a central processing unit (CPU), a processor core, a multicore processor, a multiprocessor, an application-specific integrated circuit (ASIC), and a field programmable gate array (FPGA). The processor 910 executes the program and controls the image recognition model. In an example, the processor 910 may be a graphics processor unit (GPU), reconfigurable processor, or have any other type of multi- or single-processor configuration. The program code executed by the processor 910 is stored in the memory 920. Further details regarding the processor 910 is provided below.

The memory 920 may store the image recognition model 921. The memory 920 may also store the training data. The memory 920 stores a result of evaluating, by the image recognition model 921, of the training data. The training data may include a pair of a training input and a training output. The training input may be a training image 991 and the training output may be map data 992, as illustrated. The memory 920 stores a variety of information generated during the processing at the processor 910. In addition, a variety of data and programs may be stored in the memory 920. The memory 920 may include, for example, a volatile memory or a non-volatile memory. The memory 920 may include a mass storage medium, such as a hard disk, to store a variety of data. Further details regarding the memory 920 is provided below.

The training apparatus 900 may obtain GT reference point information and GT class information by transforming the map data 992. For example, the processor 910 may extract a landmark that may be captured by an image sensor from among landmarks included in the map data 992, based on a location, a posture, and a viewing angle of the image sensor capturing the training image 991, and transform 3D coordinates of the extracted landmark into 2D coordinates on an image.

Figure 10:
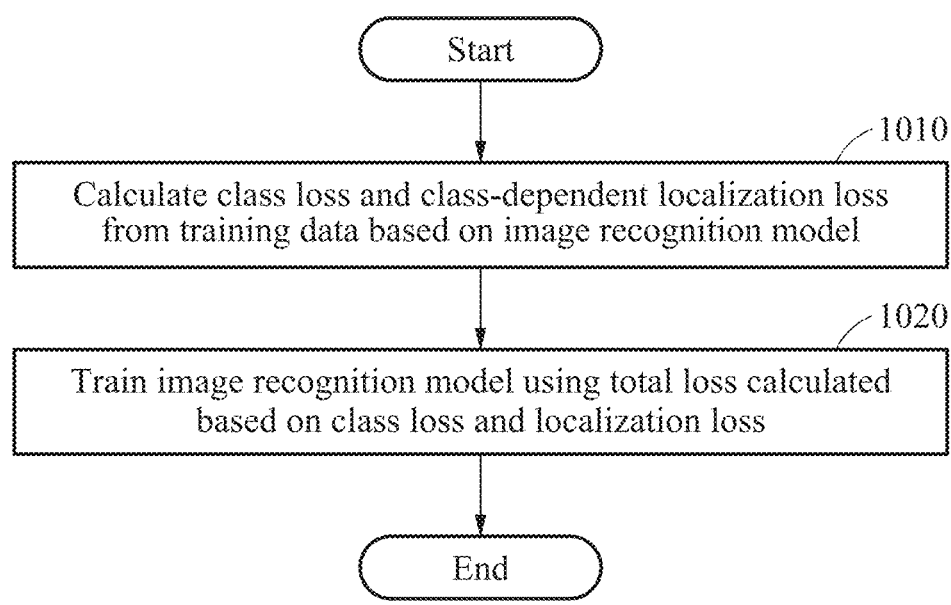
FIG. 10 is a diagram illustrating an example of a training method.

FIG. 10 is a diagram illustrating an example of a training method. The operations in FIG. 10 may be performed in the sequence and manner as shown, although the order of some operations may be changed or some of the operations omitted without departing from the spirit and scope of the illustrative examples described. Many of the operations shown in FIG. 10 may be performed in parallel or concurrently. One or more blocks of FIG. 10, and combinations of the blocks, can be implemented by special purpose hardware-based computer, such as a processor, that perform the specified functions, or combinations of special purpose hardware and computer instructions. In addition to the description of FIG. 10 below, the descriptions of FIG. 1-9 are also applicable to FIG. 10, and are incorporated herein by reference. Thus, the above description may not be repeated here.

Referring to FIG. 10, in operation 1010, a training apparatus calculates a class loss and a class-dependent localization loss from training data based on an image recognition model. For example, the training apparatus may calculate temporary class information and temporary reference point information from an input training image based on the image recognition model. The training apparatus may calculate the class loss based on the temporary class information and GT class information. The training apparatus may calculate the localization loss based on the temporary reference point information and GT reference point information.

In an example, the training apparatus may calculate a class-based weight based on the temporary class information. The training apparatus may determine the class-dependent localization loss based on the class-based weight, the temporary reference point information, and the GT reference point information. The determining of a class-dependent localization loss is described above with reference to FIG. 6, and thus a more detailed and repeated description is omitted here for brevity.

In operation 1020, the training apparatus trains the image recognition model using a total loss calculated based on the class loss and the localization loss. For example, the training apparatus may update a parameter of the image recognition model such that the total loss is minimized. The training apparatus may repetitively update the parameter of the image recognition model until the total loss converges. Thus, the training apparatus may update the parameter such that the class loss is minimized first before the localization loss is minimized.

Figure 11A:
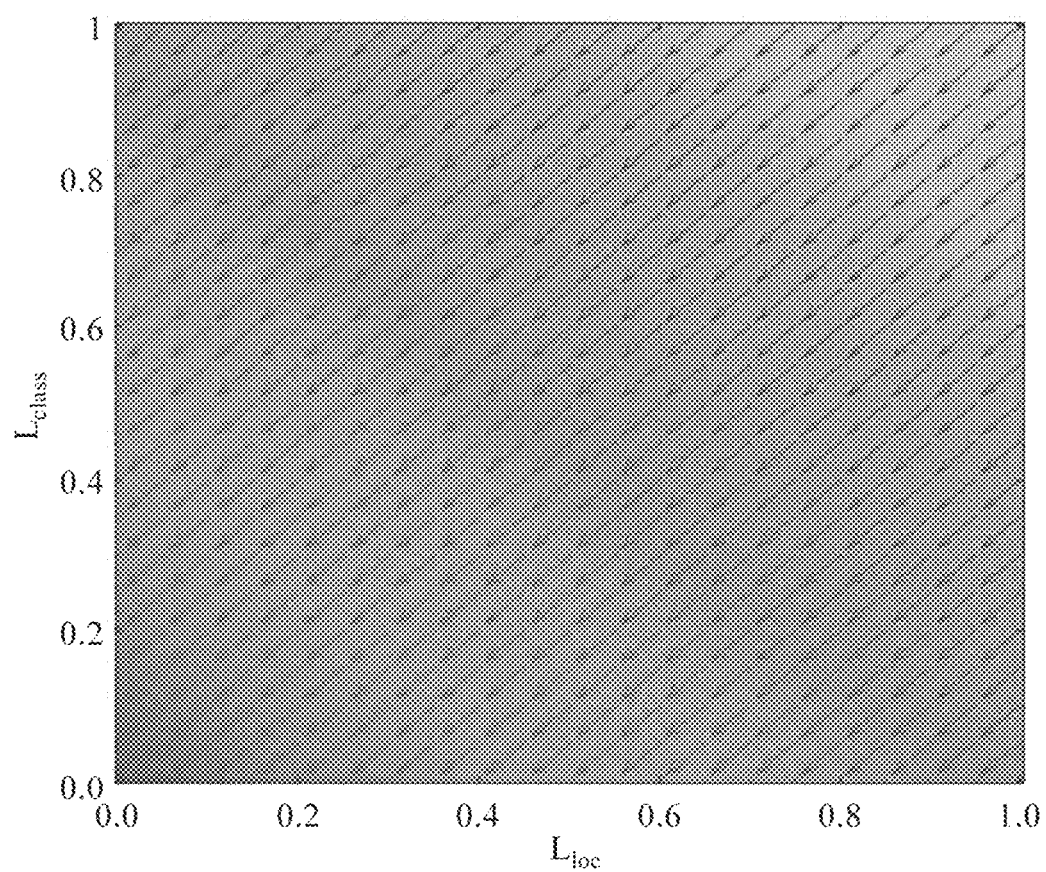
FIGS. 11A through 11C are diagrams illustrating examples of reducing a loss through training for each loss function.
Figure 11B:
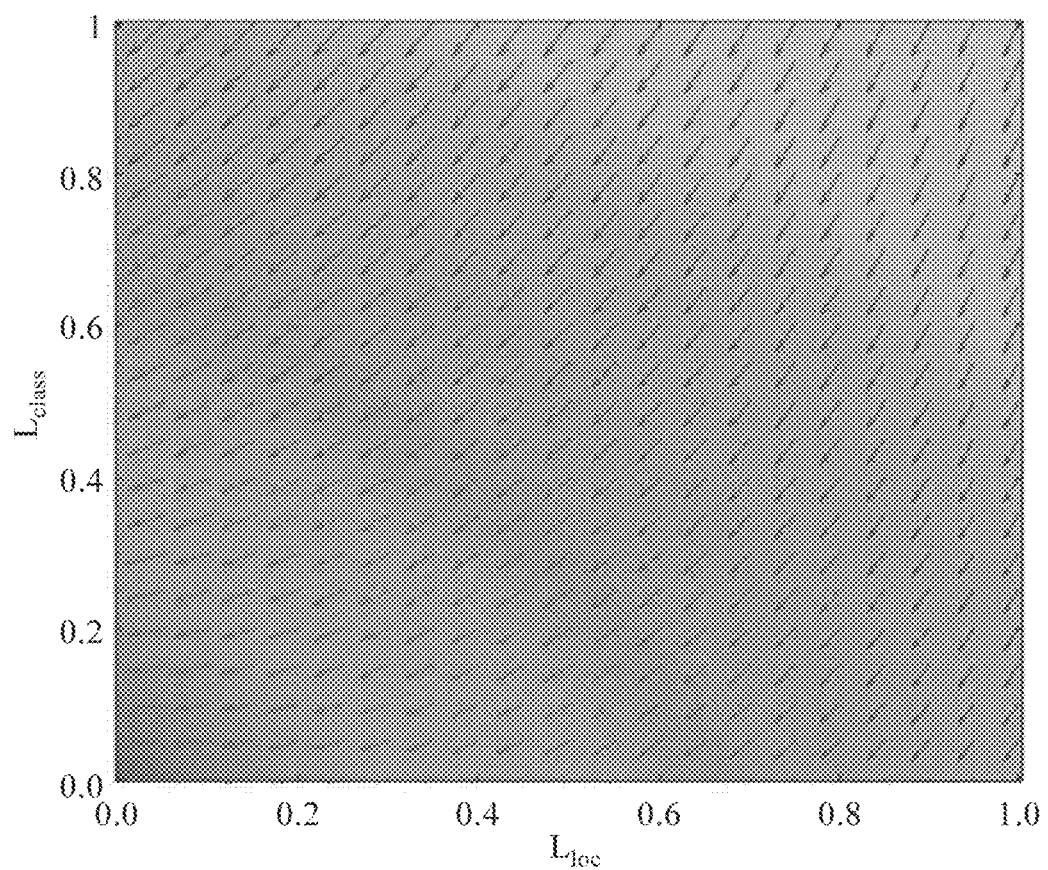
Figure 11C:
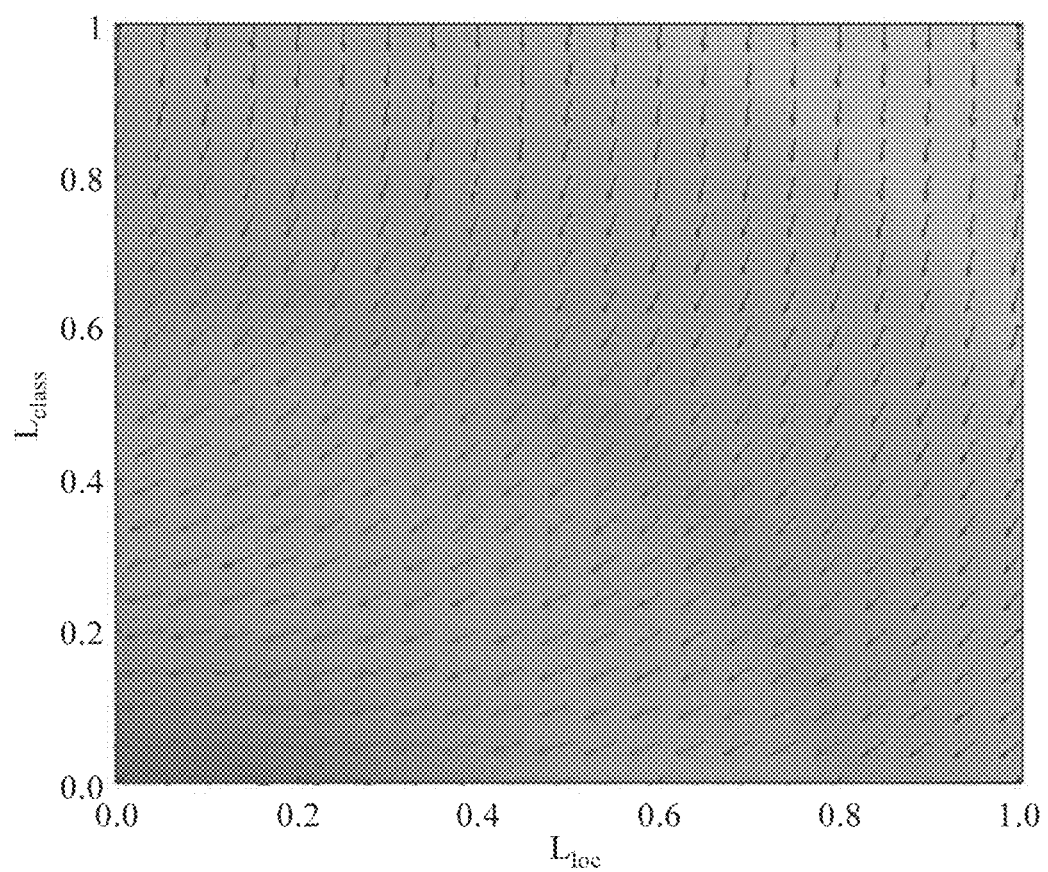

FIGS. 11A through 11C are diagrams illustrating examples of reducing a loss through training for each loss function.

In FIGS. 11A through 11C, a vertical axis indicates a magnitude of a class loss, and a horizontal axis indicates a magnitude of a localization loss.

FIG. 11A illustrates an example of how training progresses based on a loss function as represented by Equation 5.

$$L_{total}(C,r,\hat{r}) = L_{cls}(C) + L_{loc}(r,\hat{r}) \quad \text{[Equation 5]}$$

In Equation 5, $L_{loc}(r, \hat{r})$ denotes a localization loss irrespective of a class. As the loss function is defined as represented by Equation 5, a class loss and a localization loss may linearly and equally decrease with respect to each other.

FIG. 11B illustrates an example of how training progresses based on a loss function as represented by Equation 6. FIG. 11C illustrates an example of how training progresses based on a loss function as represented by Equation 7.

$$L_{total}(C,r,\hat{r}) = L_{cls}(C) + \exp(-L_{cls}(C))*(L_{loc}(r,\hat{r})) \quad \text{[Equation 6]}$$

$$L_{total}(C,r,\hat{r}) = L_{cls}(C) + \exp(-L_{cls}(C))*(L_{loc}(r,\hat{r}))^2 \quad \text{[Equation 7]}$$

In Equations 6 and 7, a localization loss $L_{loc}(r, \hat{r})$ and a class loss $L_{cls}(C)$ may be associated with each other. Thus, when loss functions are defined as represented by Equations 6 and 7 as illustrated in FIGS. 11B and 11C, a class loss may be reduced first and then a localization loss may be reduced.

Figure 12:
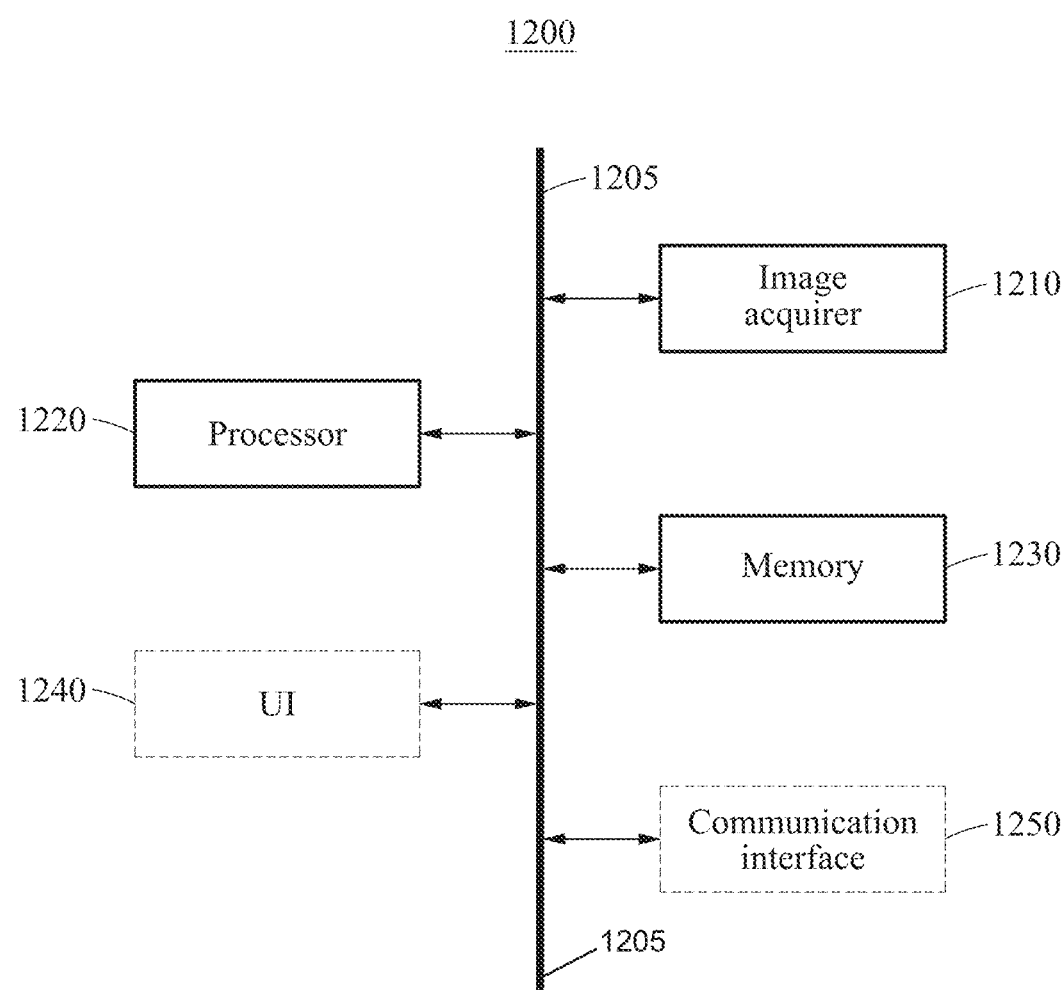
FIG. 12 is a diagram illustrating an example of an image recognition apparatus.

FIG. 12 is a diagram illustrating an example of an image recognition apparatus.

Referring to FIG. 12, an image recognition apparatus 1200 includes an image acquirer 1210, a processor 1220, a memory 1230, a UI or a display 1240, and a communication interface 1250. The processor 1220, the memory 1230, the image acquirer 1210, the UI or the display 1240, and the communication interface 1250 communicate with each other through a communication bus 1205.

The image acquirer 1210 may obtain an input image. For example, the image acquirer 1210 may include an image sensor configured to capture an image. The image sensor may be embodied by, for example, a color camera, a depth sensor, an infrared sensor, a thermal image sensor, a radio detection and ranging (RADAR) sensor, a light detection and ranging (LiDAR) sensor, and the like. However, examples of the image sensor are not limited to the examples described in the foregoing.

The processor 1220 may estimate a class of a landmark in the input image and a reference point of the landmark based on an image recognition model. For example, the processor 1220 may output a class of each of landmarks in the input image, and coordinates of a reference point of each of the landmarks in the input image. Also, the processor 1220 performs at least one method described above with reference to FIGS. 1 to 11 or an algorithm corresponding thereto.

The processor 1220 refers to a data processing device configured as hardware with a circuitry in a physical structure to execute desired operations. For example, the desired operations may include codes or instructions included in a program. For example, the data processing device configured as hardware may include a microprocessor, a central processing unit (CPU), a processor core, a multicore processor, a multiprocessor, an application-specific integrated circuit (ASIC), and a field programmable gate array (FPGA). The processor 1220 executes the program and controls the image recognition model. In an example, the processor 1220 may be a graphics processor unit (GPU), reconfigurable processor, or have any other type of multi- or single-processor configuration. The program code executed by the processor 1220 is stored in the memory 1230. Further details regarding the processor 1030 is provided below.

The memory 1230 may store the image recognition model for which training is completed. For example, the image recognition model may indicate a model having a parameter updated through a training process described above with reference to FIG. 1 through FIG. 11. However, the parameter of the image recognition model may not be set, but the image recognition apparatus 1200 may later update the parameter of the image recognition model in a real-time recognition process.

The memory 1230 stores a variety of information generated during the processing at the processor 1220. In addition, a variety of data and programs may be stored in the memory 1230. The memory 1230 may include, for example, a volatile memory or a non-volatile memory. The memory 1230 may include a mass storage medium, such as a hard disk, to store a variety of data. Further details regarding the memory 1230 is provided below.

In an example, the image recognition apparatus 1200 may accurately estimate a location of a landmark using an image recognition model trained based on a class-dependent localization loss function as described above with reference to FIGS. 1 through 11.

The UI or a display 1240 outputs the location of a landmark estimated by the processor 1220, or displays a virtual object indicating the landmark on the map data based on the accurately estimated location of the landmark. The UI or a display 1240 is a physical structure that includes one or more hardware components that provide the ability to render a user interface, render a display, and/or receive user input. However, the UI or a display 1240 is not limited to the example described above, and any other displays, such as, for example, smart phone and eye glass display (EGD) that are operatively connected to the image recognition apparatus 1200 may be used without departing from the spirit and scope of the illustrative examples described.

The image recognition apparatus 1200 may perform localization on a vehicle or a mobile terminal. The vehicle described herein refers to any mode of transportation, delivery, or communication such as, for example, an automobile, a truck, a tractor, a scooter, a motorcycle, a cycle, an amphibious vehicle, a snowmobile, a boat, a public transit vehicle, a bus, a monorail, a train, a tram, an autonomous or automated driving vehicle, an intelligent vehicle, a self-driving vehicle, an unmanned aerial vehicle, an electric vehicle (EV), a hybrid vehicle, a smart mobility device, an intelligent vehicle with an advanced driver assistance system (ADAS), or a drone. In an example, the smart mobility device includes mobility devices such as, for example, electric wheels, electric kickboard, and electric bike. In an example, vehicles include motorized and non-motorized vehicles, for example, a vehicle with a power engine (for example, a cultivator or a motorcycle), a bicycle or a handcart.

In addition to the vehicle described herein, image recognition apparatus 1200 may be included in various other devices, such as, for example, a smart phone, a walking assistance device, a wearable device, a security device, a robot, a mobile terminal, and various Internet of Things (IoT) devices.

The image recognition apparatus 1200 may estimate an accurate location of a reference point set for each class of landmarks in an input image, and thus be used to estimate a location and a direction of the vehicle or the mobile terminal. An accurate location of a reference point of a landmark may be stored in map data, for example, a high-definition 3D map, and thus the location and the direction of the vehicle may be estimated based on the accurate location.

The image recognition apparatus 1200, image recognition apparatus, training apparatus 900, training apparatus, image acquirer 1210, and other apparatuses, units, modules, devices, and other components described herein with respect to FIGS. 1, 2, 5, 7, 9, and 12 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 5, 6, 7, 8, and 10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of outputting the state information. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, card type memory such as multimedia card, secure digital (SD) card, or extreme digital (XD) card, magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of training an image recognition model, comprising:
   dividing an input training image into a plurality of subregions, wherein the divided subregions are non-overlapping;
   selecting subregions corresponding to a landmark portion from among the divided subregions of the input training image from training data by excluding at least one subregion corresponding to a background from among the divided subregions of the input training image;
   calculating a class loss and a class-dependent localization loss for the selected subregions based on an image recognition model, the calculating of the class-dependent localization loss including transforming coordinates of the landmark portion based on a viewing angle of an image sensor capturing the input training image and a posture associated with the image sensor; and
   training the image recognition model using a total loss comprising the class loss and the class-dependent localization loss,
   wherein the calculating of the total loss comprises:
      after the selecting the subregions corresponding to the landmark portion, setting a plurality of anchor nodes for each of the selected subregions;
      calculating temporary reference point information for each of the plurality of anchor nodes for each of the selected subregions;
      for each of the selected subregions, calculating a partial localization loss as a sum of differences between ground truth reference point information and the temporary reference point information for each of the plurality of anchor nodes;
      determining a sum of partial localization losses calculated for each of the selected subregions of the input training image to be the class-dependent localization loss;
      calculating temporary class information for each of the plurality of anchor nodes for each of the selected subregions;
      calculating a partial class loss between ground truth class information and the temporary class information calculated for each of the anchor nodes for the each of the selected subregions of the input training image; and
      determining a sum of partial class losses calculated for the each of the selected subregions of the input training image to be the class loss.

2. The method of claim 1, wherein the calculating of the class loss comprises:
   selecting subregions corresponding to a ground truth landmark portion from among the divided subregions of the input training image.

3. The method of claim 2, wherein the selecting of the subregions comprises:
   further selecting a subregion corresponding a ground truth background portion from among the divided subregions of the input training image.

4. The method of claim 1, wherein the calculating of the partial localization loss comprises:
   excluding a subregion with a ground truth background portion from the selected subregions.

5. The method of claim 1, wherein the calculating, of the temporary class information and the temporary reference point information for the each of the anchor nodes comprises:
   calculating temporary class information and temporary reference point information for an anchor node having a highest confidence level from among confidence levels calculated for each of the anchor nodes.

6. The method of claim 1, wherein the calculating of the temporary class information and the temporary reference point information for each of the anchor nodes comprises:
   excluding an anchor node having a confidence level less than a threshold from among confidence levels calculated for each of the anchor nodes.

7. The method of claim 1, wherein the calculating of the class loss and the class-dependent localization loss comprises:
   calculating a class-based weight based on the temporary class information; and
   determining the class-dependent localization loss based on the class-based weight, the temporary reference point information, and the ground truth reference point information.

8. The method of claim 7, wherein the determining of the class-dependent localization loss comprises:
   determining the class-dependent localization loss by applying the class-based weight to a difference between the temporary reference point information and the ground truth reference point information.

9. The method of claim 1, wherein the training comprises:
   updating a parameter of the image recognition model to minimize the total loss.

10. The method of claim 9, wherein the updating of the parameter comprises:
    repeating the updating of the parameter of the image recognition model to converge the total loss.

11. The method of claim 9, wherein the updating of the parameter comprises:
    updating the parameter such that the class loss is minimized before the localization loss is minimized.

12. A non-transitory computer-readable storage medium storing instructions that, when executed by a processor, cause the processor to perform the method of claim 1.

13. A training apparatus comprising:
    a memory configured to store an image recognition model; and
    a processor configured to:
       divide an input training image into a plurality of subregions, wherein the divided subregions are non-overlapping;
       select subregions corresponding to a landmark portion from among the divided subregions of the input training image from training data by excluding at least one subregion corresponding to a background from among the divided subregions of the input training image;
       calculate a class loss and a class-dependent localization loss for the selected subregions based on the image recognition model, the calculating of the class-dependent localization loss including transforming coordinates of the landmark portion based on a viewing angle of an image sensor capturing the input training image and a posture associated with the image sensor; and train the image recognition model using a total loss comprising the class loss and the class-dependent localization loss, wherein the processor is further configured to:
   after the selecting the subregions corresponding to the landmark portion, set a plurality of anchor nodes for each of the selected subregions;
   calculate temporary reference point information for each of the plurality of anchor nodes for each of the selected subregions;
   for each of the selected subregions, calculate a partial localization loss as a sum of differences between ground truth reference point information and the temporary reference point information for each of the plurality of anchor nodes;
   determine a sum of partial localization losses calculated for each of the selected subregions of the input training image to be the class-dependent localization loss;
   calculate temporary class information for each of the plurality of anchor nodes for each of the selected subregions;
   calculate a partial class loss between ground truth class information and temporary class information calculated for each of the anchor nodes for the each of the selected subregions of the input training image; and
   determine a sum of partial class losses calculated for the each of the selected subregions of the input training image to be the class loss.

14. An image recognition method comprising:
   obtaining an input image; and
   estimating, from the input image, a class of a landmark in the input image and a reference point of the landmark, based on an image recognition model,
   wherein the image recognition model is trained using a total loss comprising class loss and class-dependent localization loss being calculated by:
      dividing an input training image into a plurality of subregions, wherein the divided subregions are non-overlapping,
      selecting subregions corresponding to a landmark portion from among the divided subregions of the input training image from training data and excluding at least one subregion corresponding to a background from among the divided subregions of the input training image,
      calculating the class-dependent localization loss for the selected subregions based on the image recognition model by transforming coordinates of the landmark portion based on a viewing angle of an image sensor capturing the input training image and a posture associated with the image sensor, and
   wherein the total loss is calculated by:
      after the selecting the subregions corresponding to the landmark portion, setting a plurality of anchor nodes for each of the selected subregions;
      calculating temporary reference point information for each of the plurality of anchor nodes for each of the selected subregions;
      for each of the selected subregions, calculating a partial localization loss as a sum of differences between ground truth reference point information and the temporary reference point information for each of the plurality of anchor nodes;
      determining a sum of partial localization losses calculated for each of the selected subregions of the input training image to be the class-dependent localization loss;
      calculating temporary class information for each of the plurality of anchor nodes for each of the selected subregions;
      calculating a partial class loss between ground truth class information and the temporary class information calculated for each of the anchor nodes for the each of the selected subregions of the input training image; and
      determining a sum of partial class losses calculated for the each of the selected subregions of the input training image to be the class loss.

* * * * *